United States Patent [19]
Chrosziel

[11] Patent Number: 5,870,641
[45] Date of Patent: Feb. 9, 1999

[54] QUICK-CLAMPING LOCKING PLATE FOR A CAMERA

[76] Inventor: Alfred Chrosziel, Regerstr. 27, D-81541 München, Germany

[21] Appl. No.: 900,116

[22] Filed: Jul. 25, 1997

[30] Foreign Application Priority Data

Jul. 26, 1996 [DE] Germany ................. 296 13 027.3

[51] Int. Cl.$^6$ .................................................. F16M 11/04
[52] U.S. Cl. ..................... 396/425; 248/187.1; 348/376; 403/381
[58] Field of Search ..................... 396/419, 420, 396/421, 425, 428; 248/179.1, 177.1, 187.1; 348/373, 375, 376; 403/381

[56] References Cited

U.S. PATENT DOCUMENTS

| | | | |
|---|---|---|---|
| 3,356,325 | 12/1967 | Schnase | 248/187.1 |
| 4,525,052 | 6/1985 | Kosugi et al. | 366/419 |
| 4,911,574 | 3/1990 | VanderPol et al. | 403/373 |
| 4,970,709 | 11/1990 | Ishikawa | 248/187.1 |
| 5,222,826 | 6/1993 | Hanke | 403/381 |
| 5,230,490 | 7/1993 | Sloop | 248/187.1 |
| 5,332,183 | 7/1994 | Kagayama | 248/222.1 |
| 5,429,332 | 7/1995 | Ishikawa | 248/187.1 |

Primary Examiner—Eddie C. Lee
Assistant Examiner—J. K. Han
Attorney, Agent, or Firm—Blank Rome Comisky & McCauley LLP

[57] ABSTRACT

The quick-clamping locking plate for a video or film camera has a dovetail guide and straight guide edges approaching one another conically in the direction of the front end of the plate, and a locking arrangement for locking an insert part fastened to the camera in the dovetail guide. In the region of one guide edge of the dovetail guide, one abutment region of the said dovetail guide is constructed as a rocker which is pivotable about an axis perpendicular to the floor of the dovetail guide and has a guide edge which projects into the inner region of the dovetail guide, slightly above the rest of the guide edge on this side of the said dovetail guide. A pressure piece of the locking arrangement is situated behind the dovetail guide and is guided along the central longitudinal axis of the said dovetail guide.

15 Claims, 4 Drawing Sheets

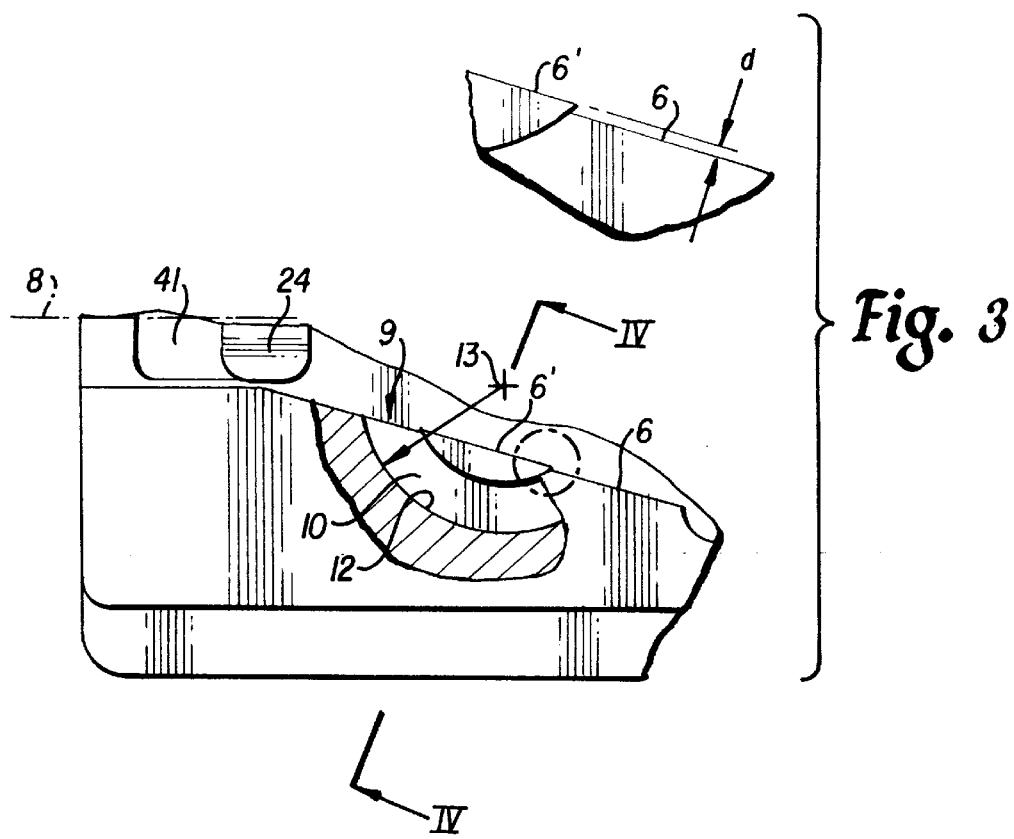
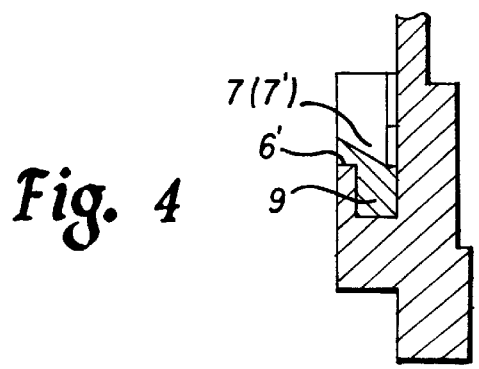
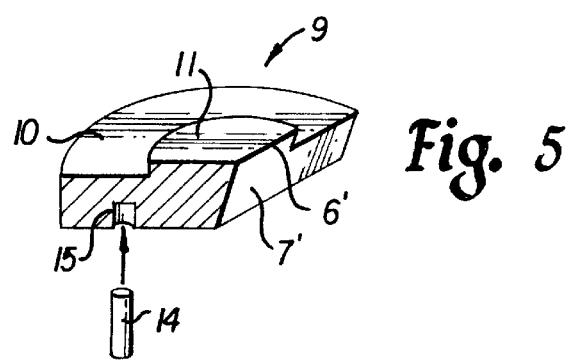

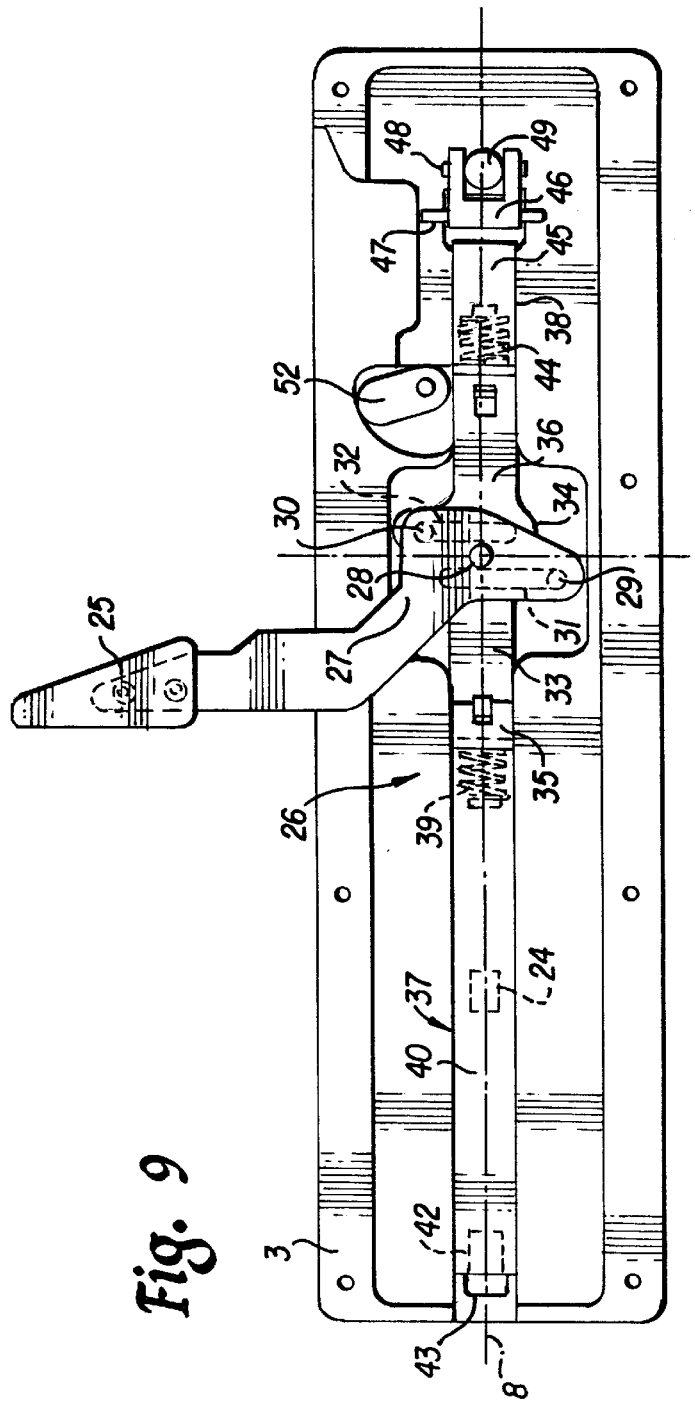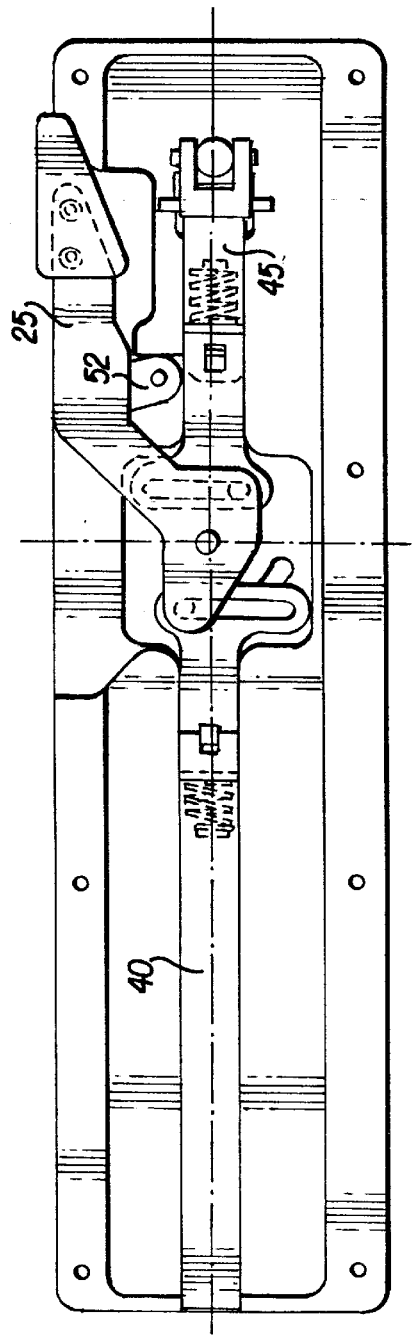

QUICK-CLAMPING LOCKING PLATE FOR A CAMERA

BACKGROUND OF THE INVENTION

The invention relates to a quick-clamping locking plate. Quick-clamping locking plates of this type are placed on a camera stand and are used so as to be able to quickly clamp in, lock and disengage a video or film camera.

To this end, a known quick-clamping locking plate has a dovetail guide in the front region, the straight guide edges of which guide approach one another conically in the direction of the front end of the plate. An insert part of complementary shape, which for its part is connected to the camera, is introduced into this dovetail guide. This insert part can then be arrested in the dovetail guide with the aid of a locking arrangement. The locking arrangement has a locking pin which is pressed, from the side, into a groove extending transversely to the central longitudinal axis of the insert part and slightly obliquely, by the force of a leg spring, so that the insert part is pressed forwards in the dovetail guide and held there. The insert part can be pressed out of the dovetail guide via a pivotable hand lever which is connected to an unlocking pin via a linkage.

It has now been found that it is definitely not possible to produce the dovetail guide and the insert part with such accuracy that a backlash-free fit of the insert part and, with it, the camera in the dovetail guide is guaranteed under all conditions. On the contrary, what happens, for example because of the penetration of particles of dust or sand, is that the fit is no longer backlash-free and therefore the insert part and, with it, the camera too "wobbles" in the dovetail guide.

Furthermore, relatively high forces, which definitely lead to deformation of material in the case of this locking plate or ones like it, are applied for the purpose of arresting the insert part and, with it, the camera in the dovetail guide, so that both the quick-clamping locking plate and also the insert part have only a limited life-span.

In general, the camera is also additionally locked at the rear end on quick-clamping locking plates of this type; for this purpose, there is provided on the plate a firmly seated locking pin under which a corresponding holding plate on the camera slides when the insert part is inserted in the dovetail guide. As a rule, this rear fit is likewise not a snug fit but operates with slight backlash, so that at that point too, firm arresting of the camera is not guaranteed.

OBJECT AND SUMMARY OF THE INVENTION

The underlying object of the invention is to improve a quick-clamping locking plate of the type in question to the effect that the camera is held in the dovetail guide in a backlash-free manner, even under unfavourable conditions, and that furthermore no deformation of material occurs, so that the useful life of the quick-clamping locking plate and insert part is prolonged.

These objects are achieved, according to the invention.

Accordingly, one abutment region of the dovetail guide is constructed, on the same side as one guide edge, as a rocker which is pivotable about an axis perpendicular to the floor of the dovetail guide. At the same time, the guide edge of this rocker projects into the inner region of the dovetail guide, slightly above the rest of the guide edge on this side of the said dovetail guide. The degree of projection may amount, for example, to 2/10ths of a millimeter. The edge length of this guide edge does not have to be very great, in the practical embodiment, it amounts to about 14 millimeters.

The rocker preferably has the shape of a wheel segment with a guide wall that is bevelled in a manner corresponding to the dovetail guide, this wheel segment being mounted in a corresponding recess in the wall of the dovetail guide and being supported at that point when the insert part is clamped into the dovetail guide. Because of this shaping, the wheel segment can be averted by a few angular degrees, so that an accurately fitting fit, which is similar to that of a three-point mounting, of the insert part and, with it, of the camera in the dovetail guide is produced; the insert part is held by the guide edge opposite the rocker, that is to say at at least two points there, and directly on the rocker in a manner corresponding to a third point. Slight axial deviations between the central longitudinal axis of the insert part and that of the dovetail guide, which may come about, for example, as a result of contamination of the dovetail guide by, say, a grain of sand, therefore have no effect on the reliable, backlash-free mounting of the insert part and, with it, of the camera in the dovetail guide.

According to the invention, the insert part is forced, via a linkage and the hand lever, into the dovetail guide by a pressure piece which acts upon the rear end of the insert part in the direction of the central longitudinal axis of the dovetail guide. In this way it is possible to avoid deformations in the material both of the dovetail guide and also of the insert part.

The disengagement of the insert part and, with it, the camera from the dovetail guide can be additionally assisted by a further pressure piece which acts upon the front edge of the insert part and, when the hand lever is pivoted outwards, presses the insert part rearwards out of the dovetail guide. Under these circumstances, the two pressure pieces are preferably connected to one another by a rigid bar.

Furthermore, the locking pin for locking the rear end of the camera is preferably also constructed as a true bolting pin which is connected, via a linkage, to the hand lever and can be displaced perpendicularly to the plate when the hand lever is pivoted. If the hand lever is in the release position, the holding plate connected to the camera engages under the locking pin and is pressed firmly onto the quick-clamping locking plate when the hand lever is pivoted into the locking position.

Further refinements of the invention become apparent from the subclaims. The invention is explained in greater detail, in an exemplified embodiment, with the aid of the drawings, in which:

DESCRIPTION OF THE DRAWINGS

FIG. 3 represents a detail view of a dovetail guide in the quick-clamping locking plate according to the invention;

FIG. 4 represents a section along IV—IV in FIG. 3;

FIG. 5 represents a diagrammatic, partial view in perspective of a rocker inside the dovetail guide;

FIG. 9 represents a bottom view of the quick-clamping locking plate according to the invention, with a bottom plate removed and in the position that releases the camera, and FIG. 10 represents a bottom view of the quick-clamping locking plate according to the invention, with a bottom plate removed and in the position that locks the camera.

DESCRIPTION OF THE PREFERRED EMBODIMENT

Figure 1:
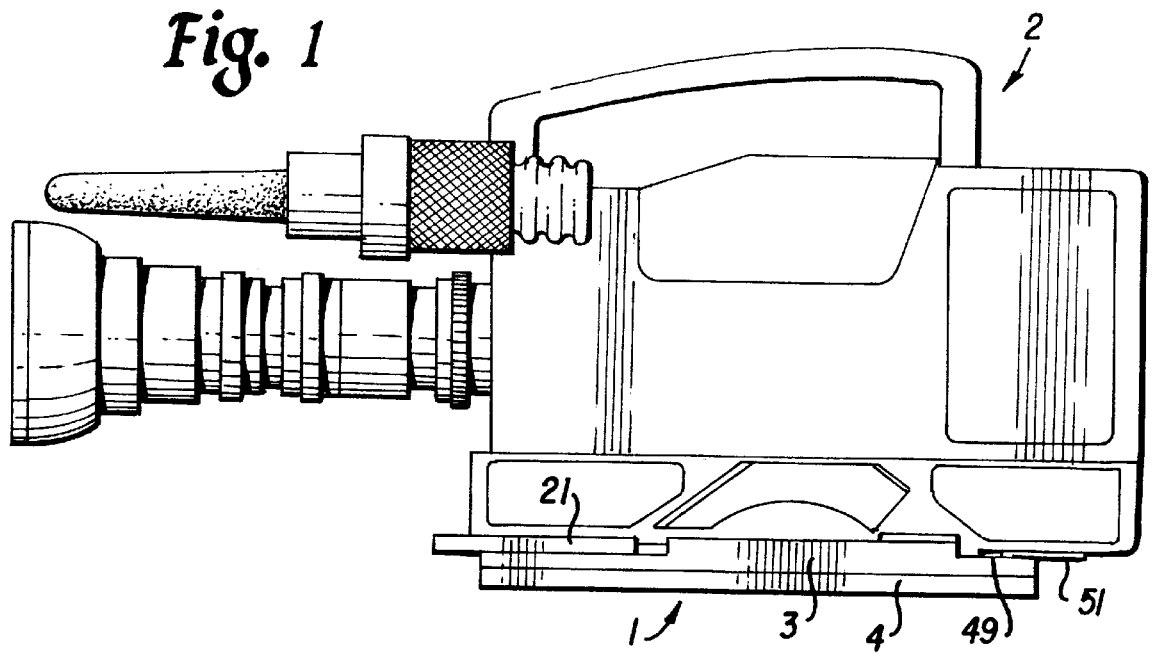
FIG. 1 represents a side view of a quick-clamping locking plate according to the invention with a camera placed thereon.

In FIG. 1, 1 represents a quick-clamping locking plate onto which a video camera 2 is placed. The quick-clamping locking plate 1 consists of a plate-shaped top part 3 and of a plate-shaped bottom part 4 of just the same kind. In the front region, the top part of the plate 1 has a dovetail guide 5, of which the two opposite guide edges 6 approach one another conically, and symmetrically to the central longitudinal axis 8 of the quick-clamping locking plate, via their inclined guide walls 7 which are drawn down to the floor of the dovetail guide, cf. FIGS. 2, 3 and 4.

In the region of one guide edge of the dovetail guide, in this case the guide edge 6 which is on the left, viewed from above, the abutment region is constructed as a pivotable rocker. This rocker has - cf. FIGS. 3, 4 and 5 - the shape of a wheel segment with an outer partial cylinder 10 and an inner partial hub 11. The rocker is supported, via the partially cylindrical outer wall of the partial cylinder 10, against a recess 12, which in the same way is of partially cylindrical shape, in the dovetail guide, and can be averted in the said dovetail guide about the centre of rotation 13, as indicated by the double arrow in FIG. 3. The rocker 9 is held in the dovetail guide by a small peg 14 which is let into the rocker 9 in a recess 15 on the underside of the said rocker. The peg 14 and recess 15 are matched to one another in their dimensions in such a way that the rocker can be averted by a narrow angular range of a few degrees, as a rule by ±2 degrees. That part of the partial hub which points towards the dovetail guide has a guide edge 6', and the side wall that faces towards the dovetail guide is inclined, in the same way as the guide walls in the other direction of the dovetail, and is designated by 7'.

As is apparent from FIG. 3, the guide edge 6' of this rocker projects, when it is set parallel to the rest of the guide edge 6 of the dovetail guide on this side, into the interior of the dovetail guide over the same height as the guide edge 6, by a small amount d of between ⅒th and ³⁄₁₀ths of a millimeter above the rest of the guide edge 6 of the dovetail guide on this side.

Figure 6:
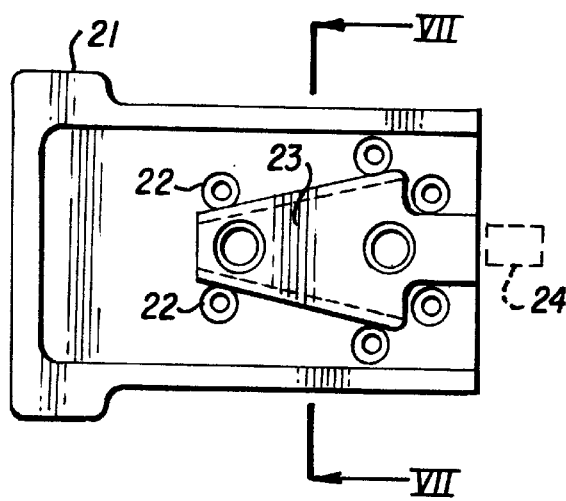
FIG. 6 represents a bottom view of the insert part for connection to the camera and for clamping into the dovetail guide.
Figure 7:
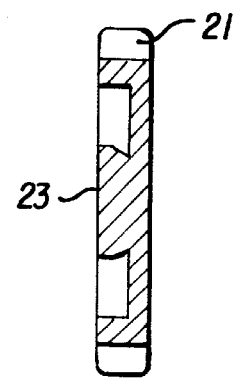
FIG. 7 represents a section along VII—VII in FIG. 6.

A fastening plate 21 (FIGS. 1, 6, 7) is connected to the camera 2 via a number of fastening holes 22 with the aid of screws which are not represented here. On its underside, this fastening plate has an insert part 23 with inclined side walls which is complementary to the dovetail guide 5 to mate therewith. For the purpose of fastening the camera 2 on the quick-clamping locking plate 1, the insert part 23 is pushed into the dovetail guide 5 and arrested in the said dovetail guide with the aid of a clamping pin 24. This clamping pin 24 is displaced along the central longitudinal axis 8 of the plate by the averting of a hand lever 25 which is connected to the clamping pin 24 via a linkage 26; in this connection, cf. FIGS. 8, 9 and 10. The hand lever 25 has an actuating plate 27 which is situated parallel to the plate-shaped top and bottom parts 3 and 4, respectively, of the quick-clamping locking plate 1 and is fastened, with a pin 28, perpendicularly to the plane of the plate in the central longitudinal axis 8 of the quick-clamping locking plate. On radially opposite sides of the pin 28, the actuating plate has two driving pins 29 and 30 which engage in slots 31 and 32 respectively, in a front and rear pressure plate 33 and 34 respectively, which slots extend perpendicularly to the central longitudinal axis.

The pressure plates 33 and 34 each have an arm 35 and 36 respectively, which is directed forwards or rearwards respectively, and each of which is guided in a guide groove 37 and 38 respectively, extending along the central longitudinal axis 8.

Figure 2:
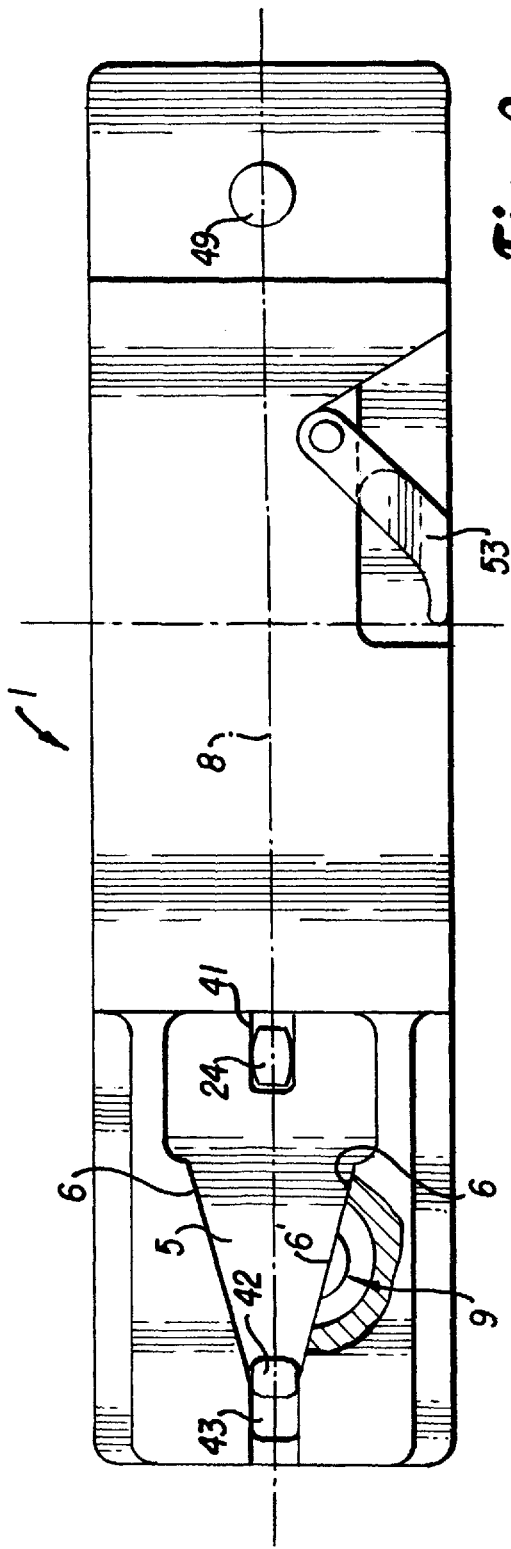
FIG. 2 represents a partially cut-away top view of the quick-clamping locking plate according to the invention.
Figure 8:
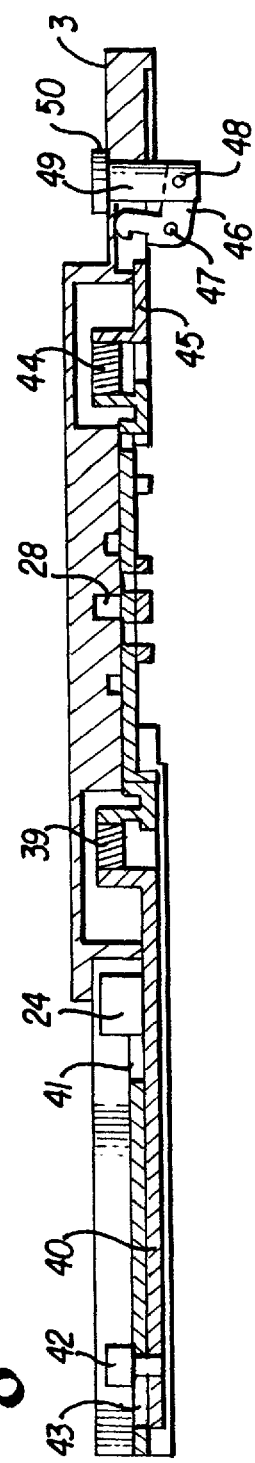
FIG. 8 represents a cross-section through a top plate of the quick-clamping locking plate according to the invention.

The front end of the arm 35 of the front pressure plate 33 is connected, via a compression spring 39, to a slide rod 40 which is guided in the guide groove 37 and carries the clamping pin 24 mentioned, which projects into the dovetail guide 5 through a perforation 41 in the guide groove 37 (FIGS. 2, 3, 8).

At its front end, the slide rod 40 carries an ejector pin 42 which likewise projects through a perforation 43 in the guide groove and is situated at the front end of the dovetail guide 5.

Adjoining, in turn, the rear end of the arm 36 of the rear pressure plate 34 is a compression spring 44 which acts upon the end of a short slide rod 45 which slides in the guide groove 38 and the opposite end of which acts upon the end of one arm of a two-armed angle 46 which, at its knee, is mounted in the quick-clamping locking plate 1, perpendicularly to the central longitudinal axis 8 and parallel to the plane of the plate, with the aid of a spindle pin 47 so as to be pivotable about the latter, and is mounted, via the end of its other arm and likewise with a spindle pin 48, so as to be pivotable on a tightening pin 49 which engages perpendicularly upwards through the quick-clamping locking plate 1. Above the surface of the quick-clamping locking plate, the tightening pin has a collar 50 under which a holding strip 51 connected to the camera engages (FIGS. 1, 8), as a result of which the camera is also locked on the quick-clamping locking plate at the rear end.

The quick-clamping locking plate 1 described functions as follows:

Starting from the position in FIG. 9, with the hand lever 25 pivoted outwards, the fastening plate 21 of the camera is introduced, via the insert part 23, into the dovetail guide 5, the holding strip 51 simultaneously engaging under the collar 50 of the upwardly extended tightening pin 49. If the hand lever 25 now starts to be pivoted against the quick-clamping locking plate and finally reaches the position in FIG. 10, the slide rods 40 and 45 are displaced forwards and rearwards respectively, as a result of which, on the one hand, the insert part 23 is forced firmly into the dovetail guide 5 and, on the other hand, the angle 46 is averted in such a way that the tightening pin 49 is tightened, and clamps in the holding strip 51. The locking force is determined by the two springs 39 and 44.

In this position, the insert part 23 is locked in the dovetail guide in a backlash-free three-point mounting; the stop 51 is also forced against the quick-clamping locking plate in a backlash-tree manner. Furthermore, when the lever 25 is in this position, the two driving pins 29 and 30 have performed their greatest possible movement, forwards and rearwards respectively, parallel to the axis 8 and, because of the radial movement of the actuating plate 27, have moved back again a small amount of a few tenths of a millimeter in the axial direction of the point of rotation of the pin 28.

This exceeding of the greatest possible axial freedom of movement results in automatic jamming of the hand lever 25 because of the spring forces of the compression springs 39 and 44. In this way, accidental disengagement of the locking system is prevented.

As is apparent from FIG. 10, in the locking position the hand lever 25 essentially does not project beyond the lateral boundary of the quick-clamping locking plate. In order to rapidly disengage the camera again from the quick-clamping locking plate, an eccentric 52 is provided, which presses on the inner side of the hand lever 25 and is, for its part, connected to an auxiliary lever 53 (FIG. 2). For disengagement purposes, therefore, the auxiliary lever 53 is briefly averted so that the hand lever 25 emerges from the quick-clamping locking plate again and can then be finally averted into the position corresponding to FIG. 9. During this avertence, the slide rod 40 is drawn rearwards, so that the ejector pin presses on the front edge of the insert part 23 and presses the said insert part, together with the fastening plate and the camera fastened thereto, out of the dovetail guide 5.

During this pivoting movement, the slide rod 45 is also drawn back, so that the tightening pin 49 is pushed upwards and the holding strip 51 is released.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed:

1. Quick-clamping locking plate adapted to be placed on a camera stand for rapid clamping-in, locking and disengaging of a camera, in particular a video or film camera, to and from said camera stand, said plate having a dovetail guide at a front end thereof, said dovetail guide having a floor, a central longitudinal axis, and a pair of confronting straight guide edges projecting from said floor at opposite sides of said axis and which approach one another conically in a direction toward said front end of the plate and define an inner region of the dovetail guide, and a locking arrangement for selectively locking an insert part fastened to the camera in mating relationship with the dovetail guide in said inner region thereof to retain the camera in place on said stand and for selectively releasing said insert part from said dovetail guide when desired to remove the camera from said stand, wherein said locking arrangement includes a pivotable hand lever, with a pressure piece acting upon said insert part and a linkage connecting the hand lever and pressure piece to one another for displacement of said pressure piece by selective operation of said hand lever to slide said insert part frontward into said inner region of the dovetail guide for locking therein and to slide said insert part rearward out of said inner region of the dovetail guide for release therefrom, said plate characterized in that, a portion of one of said guide edges of the dovetail guide adapted to abut against a mating portion of said insert part comprises a rocker which is pivotable about an axis perpendicular to said floor of the dovetail guide, said rocker having a guide edge which is substantially alignable with said one guide edge of the dovetail guide by pivoting to occupy a longitudinal portion thereof, said rocker guide edge thereby projecting into said inner region of the dovetail guide slightly above said one guide edge thereof relative to said floor, and said pressure piece of the locking arrangement is situated rearward of the dovetail guide to be guided along said central longitudinal axis thereof.

2. Quick-clamping locking plate according to claim 1, characterized in that said rocker has a shape of a wheel segment with an outer partial cylinder and an inner partial hub, wherein an outer wall of the partial cylinder is received in and abuts against a corresponding partially cylindrical recess in the dovetail guide, and the edge of the partial hub is said guide edge of the rocker.

3. Quick-clamping locking plate according to claim 2, characterized in that said rocker is disposed approximately in the longitudinal center of said one guide edge of the dovetail guide.

4. Quick-clamping locking plate according to claim 3, characterized in that said guide edge of the rocker occupies approximately ⅛th to ⅓rd of the entire length of said one guide edge of the dovetail guide.

5. Quick-clamping locking plate according to claim 4, characterized in that said pivotable hand lever is connected via a second linkage to a tightening pin in the rear end region of said plate, said tightening pin being displaceable by said second linkage perpendicularly to the plane of said plate when said hand lever is pivoted.

6. Quick-clamping locking plate according to claim 5, characterized in that said second linkage includes a two-armed angle element which has its two arms connected at a knee mounted to pivot parallel to the plane of said plate, with one of said arms pivotably connected to said tightening pin for movement thereof perpendicular to said central longitudinal axis when said one arm pivots, while the other of said arms is pivotably connected to a slide rod displaceable along said central longitudinal axis when said hand lever is pivoted, whereby to pivot said one arm.

7. Quick-clamping locking plate according to claim 1, characterized in that said rocker is disposed approximately in the longitudinal center of said one guide edge of the dovetail guide.

8. Quick-clamping locking plate according to claim 7, characterized in that said guide edge of the rocker occupies approximately ⅛th to ⅓rd of the entire length of said one guide edge of the dovetail guide.

9. Quick-clamping locking plate according to claim 8, characterized in that said pivotable hand lever is connected via a second linkage to a tightening pin in the rear end region of said plate, said tightening pin being displaceable by said second linkage perpendicularly to the plane of said plate when said hand lever is pivoted.

10. Quick-clamping locking plate according to claim 9, characterized in that said second linkage includes a two-armed angle element which has its two arms connected at a knee mounted to pivot parallel to the plane of said plate, with one of said arms pivotably connected to said tightening pin for movement thereof perpendicular to said central longitudinal axis when said one arm pivots, while the other of said arms is pivotably connected to a slide rod displaceable along said central longitudinal axis when said hand lever is pivoted, whereby to pivot said one arm.

11. Quick-clamping locking plate according to claim 1, characterized in that said guide edge of the rocker occupies approximately ⅛th to ⅓rd of the entire length of said one guide edge of the dovetail guide.

12. Quick-clamping locking plate according to claim 11, characterized in that said pivotable hand lever is connected via a second linkage to a tightening pin in the rear end region of said plate, said tightening pin being displaceable by said second linkage perpendicularly to the plane of said plate when said hand lever is pivoted.

13. Quick-clamping locking plate according to claim 12, characterized in that said second linkage includes a two-armed angle element which has its two arms connected at a knee mounted to pivot parallel to the plane of said plate, with one of said arms pivotably connected to said tightening pin for movement thereof perpendicular to said central longitudinal axis when said one arm pivots, while the other of said arms is pivotably connected to a slide rod displaceable along said central longitudinal axis when said hand lever is pivoted, whereby to pivot said one arm.

14. Quick-clamping locking plate according to claim 1, characterized in that said pivotable hand lever is connected via a second linkage to a tightening pin in the rear end region of said plate, said tightening pin being displaceable by said second linkage perpendicularly to the plane of said plate when said hand lever is pivoted.

15. Quick-clamping locking plate according to claim 14, characterized in that said second linkage includes a two-armed angle element which has its two arms connected at a knee mounted to pivot parallel to the plane of said plate, with one of said arms pivotably connected to said tightening pin for movement thereof perpendicular to said central longitudinal axis when said one arm pivots, while the other of said arms is pivotably connected to a slide rod displaceable along said central longitudinal axis when said hand lever is pivoted, whereby to pivot said one arm.

* * * * *